May 15, 1951 H. E. BAKER 2,552,660
POULTRY FEEDER
Filed Sept. 5, 1947 2 Sheets-Sheet 1

Inventor
Harry E. Baker
By Clarence A. O'Brien
and Harvey B. Jacobson
Attorneys

May 15, 1951  H. E. BAKER  2,552,660
POULTRY FEEDER

Filed Sept. 5, 1947  2 Sheets-Sheet 2

Inventor
Harry E. Baker

By Clarence A. O'Brien
and Harvey B. Jacobson
Attorneys

Patented May 15, 1951

2,552,660

UNITED STATES PATENT OFFICE 2,552,660

POULTRY FEEDER

Harry E. Baker, Macomb, Ill.

Application September 5, 1947, Serial No. 772,430

3 Claims. (Cl. 119—55)

This invention relates to poultry feeders, and the primary object of the invention is to provide a simple and efficient feeder of this character whereby the feed is protected from birds, rats or the like to prevent loss of feed.

Another object of the invention is to provide a poultry feeder in which the food holding trough is closed when the feeder is not in use and which is automatically opened to afford access to the trough when the fowl advances and stands upon a treadle to feed from the trough.

Other and more specific objects and features of the invention will become apparent from the following description when considered in connection with the accompanying drawings, in which.

Figure 1:
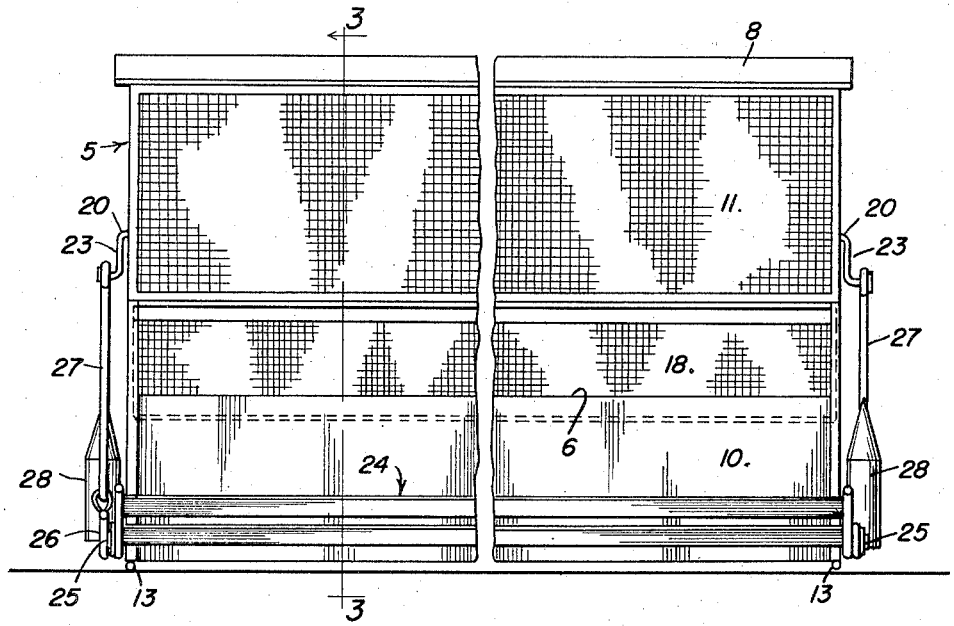
Figure 1 is a side elevational view, partly broken away, of a poultry feeder constructed in accordance with the present invention.
Figure 2:
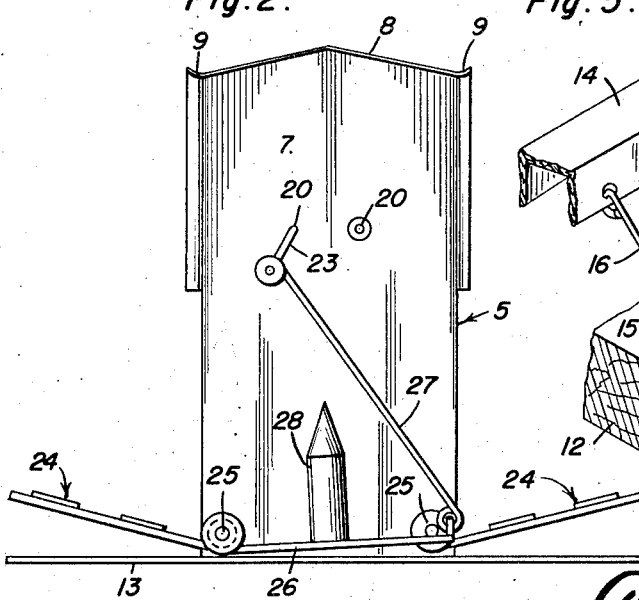
Figure 2 is an end elevational view thereof.
Figure 5:
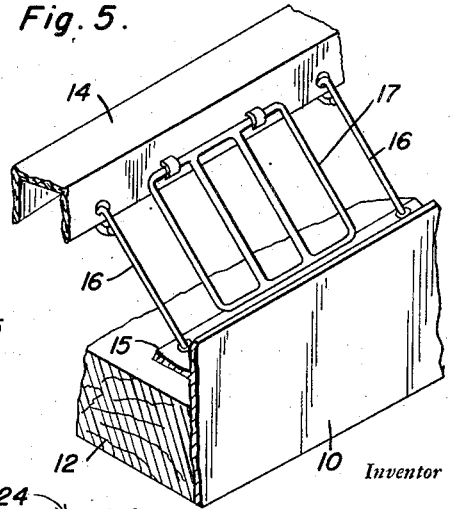
Figure 5 is a fragmentary perspective view showing details of the means for excluding the fowl from the feed.

Referring in detail to the drawings, 5 indicates a horizontally elongated housing whose bottom portion forms a feed trough, and which has feed openings 6 that extend entirely across the sides of the housing. As shown, the housing includes sheet metal end walls 7, a sheet metal roof 8 shaped to form gutters 9 along the longitudinal edges thereof, side walls composed of sheet metal lower portions 10 and foraminous upper portions 11, and a bottom wall 12. Bottom wall 12 may consist of a wooden block fitted and secured within the bottom portion of the housing and above which the lower portions of the side walls 10 project. At its ends, the housing is provided with transverse runners 13 that project beyond opposite sides of the housing and serve to prevent the feeder from being readily turned over on its sides. Connecting the ends of the housing midway between the sides of the latter and in a plane near the tops of the openings 6 is an inverted channel 14. At points between the bottoms of the openings 6 and the bottom wall 12, the lower portions 10 of the side walls are provided with inwardly projecting flanges 15. Bars 16 connect each flange 15 with the adjacent flange of channel member 14 at each side of the housing, and these bars 16 are spaced apart a distance to admit the head of a fowl therebetween while excluding the fowl from bodily entering the housing and causing contamination and loss of feed. As shown, each bar 16 is in the form of a wire rod having its ends engaged in openings of the flange 15 and channel member 14 and clinched therein. Midway between the ends of the housing, several of the bars 16 are omitted at one side of the housing and a space is thus left where a hinged grating-type door 17 is provided to facilitate access to the trough for filling and cleaning the same.

Figure 3:
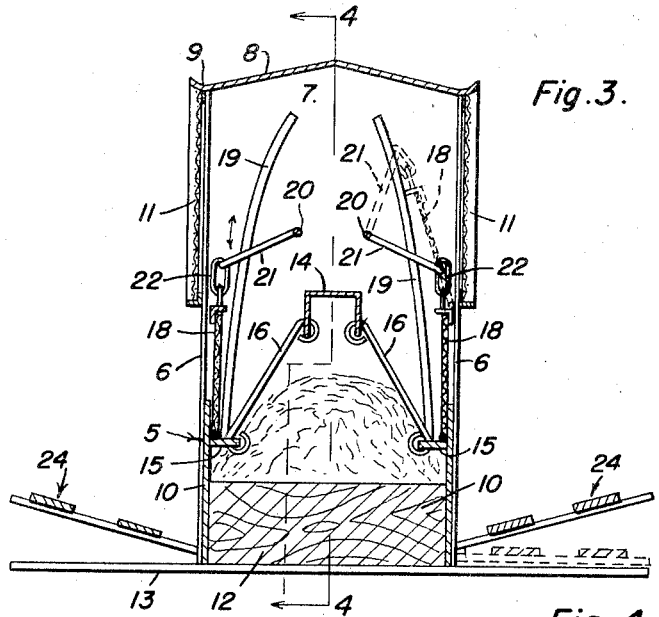
Figure 3 is a vertical transverse section taken on line 3—3 of Figure 1.
Figure 4:
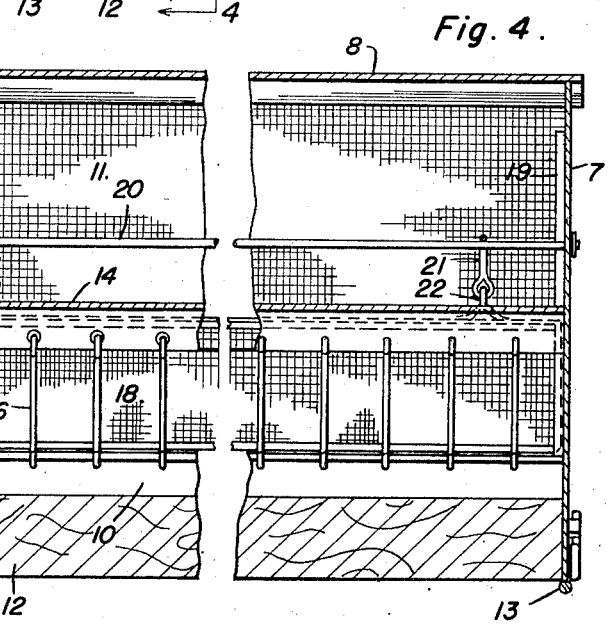
Figure 4 is a vertical longitudinal section, partly broken away, taken on line 4—4 of Figure 3.

A vertically slidable closure member 18 is provided for each of the openings 6, the same being guided in its vertical movements by guide bars 19 fixed to the inner surfaces of the end walls 7 and having the upper portions thereof extended upwardly and inwardly as shown more clearly in Figure 3. The closure members 18 are preferably of foraminous form as shown so as to permit the fowl to see the feed within the trough therethrough. Journalled longitudinally of and within the housing 5 inwardly of and above each closure member 18 is a horizontal rock shaft 20 having crank arms 21 connected to the opposite end portions of the associated closure member 18 by means of links 22. Each rock shaft 20 has an end projecting through a different end wall 7 of the housing and has a crank 23 on the projecting end thereof. A vertically swingable treadle or platform 24 is provided along each side of the housing 5 and pivoted to the ends of and adjacent the bottom of the latter as at 25. At different ends, each treadle or platform 24 is provided with an arm 26 that projects across the adjacent end of the housing, and each arm 26 is connected by a link 27 with the crank 23 at the adjacent end of the housing. The arrangement is such that when either treadle is depressed, the closure member 18 at the adjacent side of the housing will be elevated as shown by dotted lines with respect to one of the closure members in Figure 3. Each arm 26 carries a weight 28 so as to normally swing the associated treadle upwardly to a raised position. This weight is such that a fowl of predetermined weight is required to stand upon the treadle to depress the same and open the associated closure member 18. As birds, rats, mice and the like are of lesser weight, that will be unable to open the closure members and obtain access to the feed within the trough of the housing. Naturally, when the fowl leaves a treadle or platform, the associated weight 28 automatically swings the treadle to a raised position and allows the associated closure member 18 to gravitate to closed position.

From the foregoing description, it is believed that the construction, operation and advantages of the present invention will be readily understood and appreciated by those skilled in the art. Modifications and changes in details of construction are contemplated, such as fall within the scope of the invention as claimed.

Having described the invention what is claimed as new is:

1. A poultry feeder comprising a housing having vertical side and end walls and whose bottom portion forms a trough, one side wall of the housing having a vertical feed opening that extends entirely across the side of the housing, a vertically slidable and inwardly tiltable closure member for the feed opening arranged within the housing at the inner side of said one side wall, a vertically swingable treadle disposed outside and along said one side wall of the housing and pivoted to the lower portion of the end walls of the housing and adjacent said one side wall for vertical swinging movement, and means operable by a downward movement of the treadle and connected to the closure member for sliding the latter upwardly to open position when the treadle is depressed, the treadle having a projecting arm extending across an end of the housing, a weight on said arm acting to normally elevate the treadle, said means including a horizontal rock shaft journalled in the ends of and extending from end to end of the housing, spaced crank arms carried by the rock shaft within the housing and loosely connected to the top of the closure member, one end of said rock shaft extending exteriorly of the housing and provided with a crank, and a link connection between the last named crank and said projecting arm of the treadle, and guide bars secured to the inner faces of the end walls of the housing inwardly of the ends of the closure member for guiding the latter in its vertical movements, the upper ends of said guide bars being extended upwardly and inwardly.

2. In a poultry feeder, a housing having vertical side and end walls and whose bottom portion forms a trough, one side wall of the housing having a vertical feed opening that extends entirely across the side of the housing, an inwardly projecting flange on said one side wall of the housing below said opening, a horizontal member connecting the end walls of the housing inwardly of and above said flange, spaced bars connecting said flange and said horizontal member at spaced intervals, and a hinged grating type door between certain of said bars.

3. In a poultry feeder, a housing having vertical side and end walls and whose bottom portion forms a trough, the side walls of the housing having vertical feed openings that extend entirely across the sides of the housing, a horizontal inverted channel member rigidly connecting the end walls of the housing inwardly of and in a plane at the tops of said openings, the side walls of the housing having inwardly projecting flanges below said openings, and spaced bars connecting each inwardly projecting flange with the adjacent flange of the channel member.

HARRY E. BAKER.

REFERENCES CITED

The following references are of record in the file of this patent:

UNITED STATES PATENTS

| Number | Name | Date |
|---|---|---|
| 1,343,093 | Shoultz | June 8, 1920 |
| 1,585,910 | Olson | May 25, 1926 |
| 1,886,593 | Rupprecht | Nov. 8, 1932 |
| 2,386,010 | Spivey | Oct. 2, 1945 |